(12) United States Patent
Shimizu

(10) Patent No.: US 9,904,153 B2
(45) Date of Patent: Feb. 27, 2018

(54) PROJECTION DEVICE, PROJECTOR, AND IMAGE ADJUSTMENT METHOD

(71) Applicant: FUJIFILM Corporation, Tokyo (JP)

(72) Inventor: Hitoshi Shimizu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/632,839

(22) Filed: Jun. 26, 2017

(65) Prior Publication Data

US 2017/0293210 A1 Oct. 12, 2017

Related U.S. Application Data

(63) Continuation of application No. PCT/JP2015/085077, filed on Dec. 15, 2015.

(30) Foreign Application Priority Data

Jan. 15, 2015 (JP) ................................. 2015-006068

(51) Int. Cl.
*G03B 21/14* (2006.01)
*G02B 13/04* (2006.01)
*G02B 13/16* (2006.01)

(52) U.S. Cl.
CPC ........... *G03B 21/142* (2013.01); *G02B 13/04* (2013.01); *G02B 13/16* (2013.01)

(58) Field of Classification Search
CPC .......... G02B 13/04; G02B 13/16; G02B 7/08; G03B 21/00; G03B 21/14; G03B 13/34; G03B 3/10; H04N 5/74

See application file for complete search history.

(56) References Cited

U.S. PATENT DOCUMENTS

| 2002/0154276 A1 | 10/2002 | Narimatsu et al. |
| 2005/0179875 A1 | 8/2005 | Aoyanagi |
| 2011/0299173 A1 | 12/2011 | Kawana |

FOREIGN PATENT DOCUMENTS

| JP | 9-304679 A | 11/1997 |
| JP | 2000-81601 A | 3/2000 |

(Continued)

OTHER PUBLICATIONS

International Search Report for PCT/JP2015/085077 (PCT/ISA/210) dated Mar. 15, 2016.

(Continued)

*Primary Examiner* — Sultan Chowdhury
*Assistant Examiner* — Danell L Owens
(74) *Attorney, Agent, or Firm* — Birch, Stewart, Kolasch & Birch, LLP

(57) ABSTRACT

A projection unit has a zoom adjustment unit, an image-plane correction unit, a first drive unit, and a solenoid-actuator. The zoom adjustment unit enlarges or reduces a projected-image by moving a first lens group in a K direction. The image-plane correction unit performs image-plane correction on the projected-image by moving a second lens group in the K direction. The first drive unit includes a switching-gear, drives the zoom adjustment unit in a state in which the switching-gear is connected to the zoom adjustment unit, and drives the image-plane correction unit in a state in which the switching-gear is connected to the image-plane correction unit. In a case of driving one of the zoom adjustment unit and the image-plane correction unit, the solenoid-actuator switches the switching-gear from the other of the zoom adjustment unit and the image-plane correction unit to one of the zoom adjustment unit and the image-plane correction unit.

20 Claims, 6 Drawing Sheets

(56) References Cited

FOREIGN PATENT DOCUMENTS

| | | | |
|---|---|---|---|
| JP | 2005-229415 A | | 8/2005 |
| JP | 2011-10114 A | | 1/2011 |
| JP | 2011-209402 A | | 10/2011 |
| JP | 2011209402 A | * | 10/2011 |
| JP | 2011-253074 A | | 12/2011 |
| JP | 2012-29152 A | | 2/2012 |
| JP | 2013-57852 A | | 3/2013 |
| JP | 2013-88652 A | | 5/2013 |
| JP | 2014-202882 A | | 10/2014 |
| WO | WO 2002/016994 A | | 2/2002 |

OTHER PUBLICATIONS

Written Opinion of the International Searching Authority for PCT/JP2015/085077 (PCT/ISA/237) dated Mar. 15, 2016.

* cited by examiner

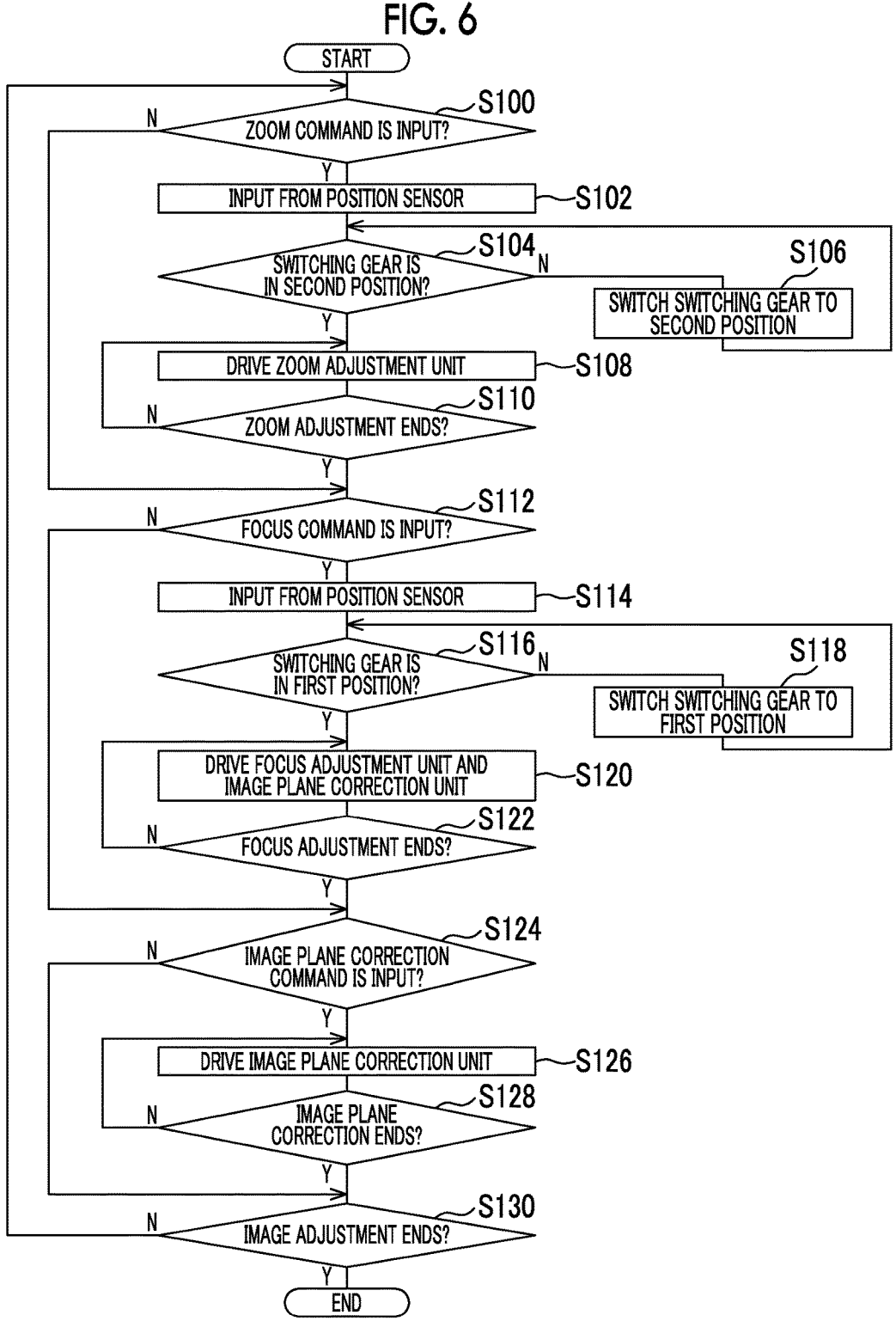

US 9,904,153 B2

PROJECTION DEVICE, PROJECTOR, AND IMAGE ADJUSTMENT METHOD

CROSS-REFERENCE TO RELATED APPLICATIONS

This application is a Continuation of PCT International Application No. PCT/JP2015/085077 filed on Dec. 15, 2015, which claims priority under 35 U.S. §119(a) to Japanese Patent Application No. 2015-006068 filed on Jan. 15, 2015. Each of the above application(s) is hereby expressly incorporated by reference, in its entirety, into the present application.

BACKGROUND OF THE INVENTION

1. Field of the Invention

The present invention relates to a projection device, a projector, and an image adjustment method.

2. Description of the Related Art

As an example of a mechanism for automatically moving a lens in an optical axis direction, mechanisms described in JP2013-57852A and JP2011-253074A are known.

JP2013-57852A discloses a projector having a first group, a second group, and a third group which respectively have a plurality of lenses and are arranged on an optical axis. The first group includes a part functioning as a focus optical system and a part functioning as a zoom optical system. The second group is an adjustment optical element. The third group adjusts the position of an image forming plane required according to the forward/backward movement of the second group. The third group slides and is moved in synchronization with the first group by a first drive mechanism. The second group is driven by a second drive mechanism.

JP2011-253074A discloses a configuration in which focus adjustment is performed by moving a first lens group in an optical axis direction and zoom adjustment is performed by moving a second lens group, a third lens group, and a fourth lens group in the optical axis direction. The second lens group and the third lens group are moved integrally by the same drive mechanism.

SUMMARY OF THE INVENTION

As a projection device for use in a projector, a projection device having a focus lens which performs focus adjustment, a zoom lens which enlarges or reduces a projected image, and an image plane correction lens which performs correction (image plane correction) of a field curvature in a peripheral portion of a projected image is known. While the movement of the focus lens and the zoom lens in an optical axis direction is performed automatically by a motor, the movement of the image plane correction lens in the optical axis direction is performed manually.

While JP2013-57852A or JP2011-253074A discloses a configuration in which a common drive mechanism moves a plurality of lens groups, a plurality of lens groups cannot be driven independently in the drive mechanism in these documents. Since a plurality of lens groups cannot be driven independently, in a case of moving each lens group independently, drive mechanisms increase, and the configuration of the projection device becomes complicated. Accordingly, there is room for improvement in automating image plane correction with a simple configuration.

In consideration of the above-described fact, an object of the invention is to provide a projection device, a projector, and an image adjustment method capable of automating image plane correction with a simple configuration.

A projection device according to a first aspect of the invention comprises an image variable magnification unit which includes a first optical system including a plurality of lenses and enlarges or reduces a projected image by moving the first optical system in an optical axis direction of light from a light source, an image plane correction unit which includes a second optical system and performs image plane correction on the projected image by moving the second optical system in the optical axis direction, a drive unit which includes a connection portion being selectively connected to one of the image variable magnification unit and the image plane correction unit, moves the first optical system in the optical axis direction by driving the image variable magnification unit in a state in which the connection portion is connected to the image variable magnification unit, and moves the second optical system in the optical axis direction by driving the image plane correction unit in a state in which the connection portion is connected to the image plane correction unit, and a switching unit which is provided in the drive unit, and in a case of driving one of the image variable magnification unit and the image plane correction unit, switches the connection portion from the other of the image variable magnification unit and the image plane correction unit to the one of the image variable magnification unit and the image plane correction unit.

In the projection device according to the first aspect, the switching unit switches the connection portion of the drive unit from the other of the image variable magnification unit and the image plane correction unit to the one of the image variable magnification unit and the image plane correction unit, whereby it is possible to drive the image plane correction unit without increasing drive units, thus, it is possible to automate image plane correction with a simple configuration.

A projection device according to a second aspect of the invention further includes a focus adjustment unit which includes a third optical system and moves the third optical system in the optical axis direction to adjust the focus of the projected image, and a different drive unit which drives the focus adjustment unit, and in a case where the different drive unit drives the focus adjustment unit, the drive unit drives the image plane correction unit in conjunction with the drive of the different drive unit.

In the projection device according to the second aspect, a command for image plane correction on a field curvature varying due to a focus operation is not required. For this reason, it is possible to reduce complicated adjustment work of a user at the time of the image plane correction.

In a projection device according to a third aspect of the invention, the focus adjustment unit is disposed on the projected image side from the image plane correction unit.

In the projection device according to the third aspect, since the focus adjustment unit is disposed on the projected image side from the image plane correction unit, it is possible to approach to each other between the image plane correction unit and the image variable magnification unit driven by a common drive unit.

In a projection device according to a fourth aspect of the invention, the switching unit is provided with a position detection unit which detects a connection position of the connection portion to either of the image variable magnification unit or the image plane correction unit, and in a case where the different drive unit drives the focus adjustment unit, after the position detection unit detects the connection position of the connection portion on the image plane correction unit side, the drive unit drives the image plane correction unit in conjunction with the drive of the different drive unit.

In the projection device according to the fourth aspect, since the image plane correction unit is drivable in a case where the position detection unit detects the connection position of the connection portion on the image plane correction unit side, it is possible to suppress an erroneous operation of the image plane correction unit.

In a projection device according to a fifth aspect of the invention, in a case where the different drive unit drives the focus adjustment unit, the drive unit drives the image plane correction unit in a state in which the interval between the third optical system and the second optical system on the optical axis is maintained.

In the projection device according to the fifth aspect, the interval between the third optical system and the second optical system on the optical axis is maintained, whereby a moving distance of the second optical system, which is required for adjustment of the second optical system, is shortened after the third optical system is adjusted. For this reason, it is possible to shorten the time required for the focus adjustment and the image plane correction.

A projector according to a sixth aspect of the invention comprises a light source, an image forming panel which displays an image and is irradiated with light from the light source, and the projection device according to any one of the first aspect to the fifth aspect which projects the image formed on the image forming panel onto a projection surface.

In the projector according to the sixth aspect, the switching unit switches the connection portion of the drive unit from the other of the image variable magnification unit and the image plane correction unit to the one of the image variable magnification unit and the image plane correction unit, whereby it is possible to drive the image plane correction unit without increasing drive units, thus, it is possible to automate image plane correction with a simple configuration.

An image adjustment method according to a seventh aspect of the invention adjusts a projected image, using the projection device according to any one of the second aspect to the fifth aspect, by performing a first step of driving the image variable magnification unit with the drive unit, a second step of switching the connection portion from the image variable magnification unit to the image plane correction unit with the switching unit to simultaneously drive the image plane correction unit and the focus adjustment unit, and a third step of driving the image plane correction unit alone with the drive unit.

In the image adjustment method according to the seventh aspect, in a case where the focus adjustment and the image plane correction are performed simultaneously, since adjustment can be performed by driving the image plane correction unit alone even if deviation occurs in the adjustment state of the image plane correction, it is possible to increase accuracy of image plane correction.

According to the invention, it is possible to automate image plane correction with a simple configuration.

BRIEF DESCRIPTION OF THE DRAWINGS

FIG. 6 is a flowchart showing the flow of image adjustment in the projector according to this embodiment.

DESCRIPTION OF THE PREFERRED EMBODIMENTS

Hereinafter, an example of an embodiment of a projection device, a projector, and an image adjustment method according to the invention will be described.

Overall Configuration

Figure 1:
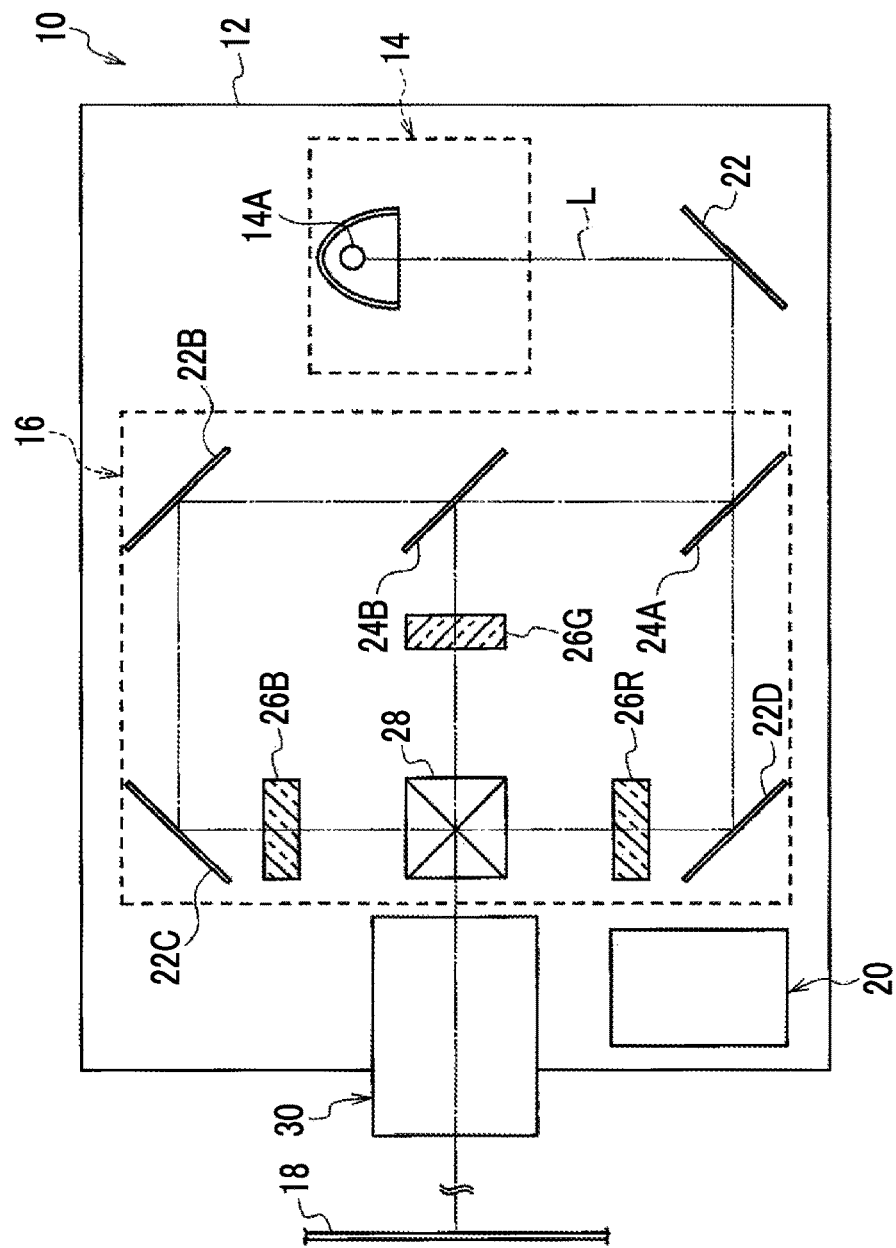
FIG. 1 is an explanatory view showing the overall configuration of a projector according to this embodiment.

FIG. 1 shows a projector 10 of this embodiment. The projector 10 includes a light source unit 14 as an example of a light source, an information light generation unit 16 which generates information light from light L incident from the light source unit 14, and a projection unit 30 as an example of a projection device which projects information light onto a screen 18 as an example of a projection surface. The light source unit 14 and the information light generation unit 16 are housed in a housing 12 which constitutes the body of the projector 10. The projection unit 30 is detachably and attachably mounted in a part of the housing 12 on the screen 18 side. The projector 10 is provided with a control unit 20 which controls the drive of each unit. In addition, an input unit 40 (see FIG. 4) which performs various inputs (focus adjustment, zoom adjustment, image plane correction, and the like) to the control unit 20 is provided separately from the projector 10.

Light Source Unit

The light source unit 14 includes a lamp 14A, and a reflection mirror, an ultraviolet cut filter, an integrator, a relay lens, a collimator lens, and a polarizer (not shown). Then, light L emitted from the lamp 14A is reflected by a reflection mirror 22A provided in the housing 12 and is guided to the information light generation unit 16.

Information Light Generation Unit

The information light generation unit 16 includes dichroic mirrors 24A and 24B, reflection mirrors 22B, 22C, and 22D, transmissive liquid crystal panels 26R, 26G and 26B as light valves, and a dichroic prism 28. The liquid crystal panels 26R, 26G and 26B are examples of image forming panels, and display images and are irradiated with light L from the light source unit 14.

The dichroic mirror 24A transmits a red light component out of light L incident from the light source unit 14 and guides the red light component to the reflection mirror 22D. The reflection mirror 22D makes red light incident from the dichroic mirror 24A incident on the liquid crystal panel 26R. The dichroic mirror 24A reflects a green light component and a blue light component out of light L incident from the light source unit 14 and guides the green light component and the blue light component to the dichroic mirror 24B.

The dichroic mirror 24B reflects the green light component out of light incident from the dichroic mirror 24A and makes the green light component incident on the liquid crystal panel 26G The dichroic mirror 24B transmits the blue light component out of light incident from the dichroic mirror 24A and guides the blue light component to the reflection mirror 22B. The transmitted blue light component is reflected by the reflection mirror 22B and the reflection mirror 22C and is incident on the liquid crystal panel 26B.

In the liquid crystal panel 26R, a component displayed in red out of projected image data is displayed in grayscale, whereby incident light is transmitted therethrough and red information light is made. In the liquid crystal panel 26G a component displayed in green out of projected image data is displayed in grayscale, whereby incident light is transmitted therethrough and green information light is made. In the liquid crystal panel 26B, a component displayed in blue out of projected image data is displayed in grayscale, whereby incident light is transmitted therethrough and blue information light is made.

Red information light transmitted through the liquid crystal panel 26R, green information light transmitted through the liquid crystal panel 26G and blue information light transmitted through the liquid crystal panel 26B are incident on the dichroic prism 28. Then, the dichroic prism 28 combines red, green, and blue information light incident from the liquid crystal panels 26R, 26G and 26B to make projection light, and guides projection light to the projection unit 30, thereby projecting an image onto the screen 18. In this embodiment, emission of light from the projection unit 30 toward the screen 18 is referred to as projection, and an image on the screen 18 is referred to as a projected image.

Main Part Configuration

Next, the projection unit 30 will be described.

Figure 2:
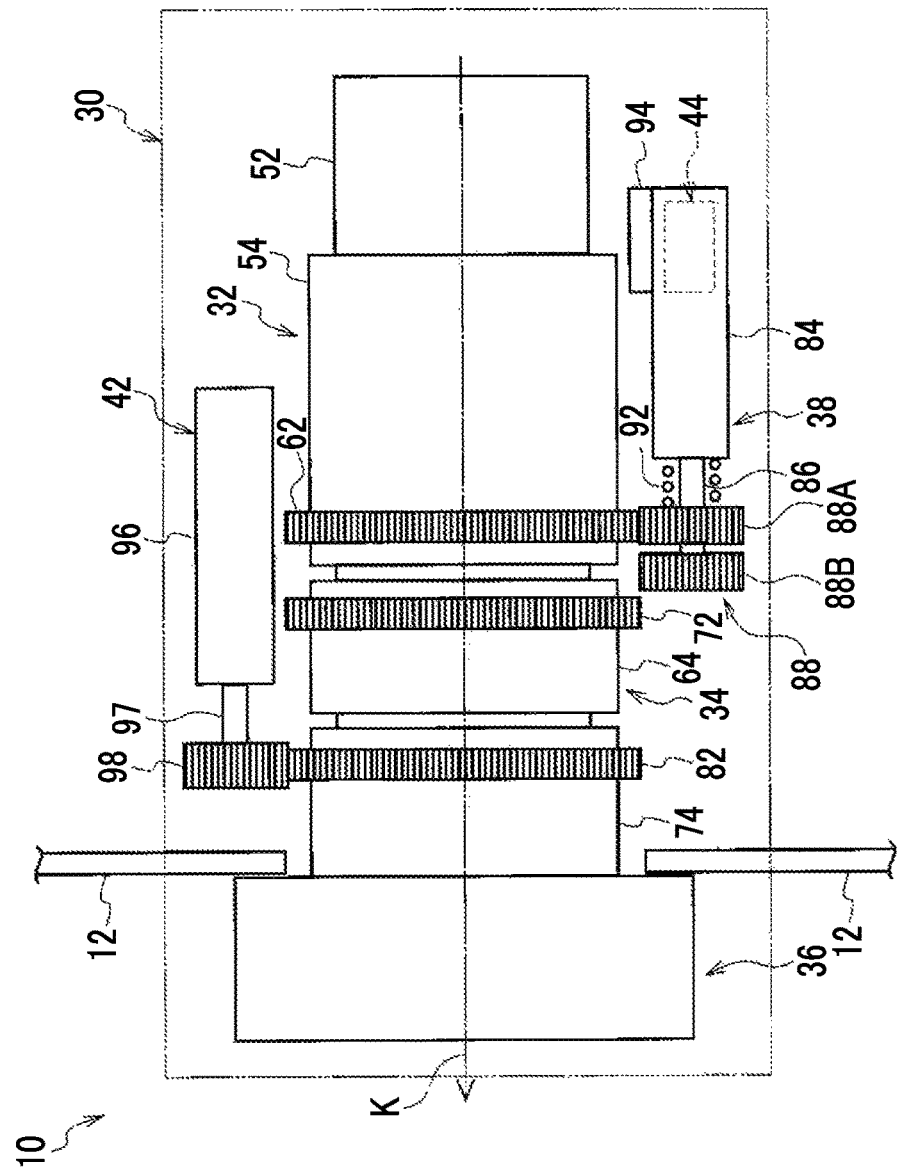
FIG. 2 is an explanatory view showing the schematic configuration of a projection unit according to this embodiment.

As shown in FIG. 2, the projection unit 30 has a zoom adjustment unit 32 which enlarges or reduces a projected image (not shown) on the screen 18 (see FIG. 1), an image plane correction unit 34 which performs image plane correction on the projected image, and a focus adjustment unit 36 which adjusts the focus of the projected image. Then, the projection unit 30 is configured to project images formed on the liquid crystal panels 26R, 26Q and 26B (see FIG. 1) onto the screen 18.

Furthermore, the projection unit 30 has a first drive unit 38 which drives the zoom adjustment unit 32 or the image plane correction unit 34, a second drive unit 42 which drives the focus adjustment unit 36, and a solenoid actuator 44 (see FIG. 4) which switches a switching gear 88 described below.

In addition, the projection unit 30 has a fixed cylinder 52 having a cylindrical shape. The fixed cylinder 52 is disposed at a position where an optical axis K of light incident through the dichroic prism 28 (see FIG. 1) becomes a central axis. In a part of a circumferential wall of the fixed cylinder 52, a plurality of long holes (not shown) which pass therethrough in a radial direction and are arranged along the optical axis K are formed. In addition, a lens 59 (see FIG. 3) is fixed in an end portion on the dichroic prism 28 (see FIG. 3) inside the fixed cylinder 52. In FIG. 2, the optical axis K is indicated by a one-dot-chain line. In the following description, an optical axis direction along the optical axis K is referred to as a K direction.

Zoom Adjustment Unit

The zoom adjustment unit 32 shown in FIG. 2 is an example of an image variable magnification unit. The zoom adjustment unit 32 has a first rotating cylinder 54 through which the fixed cylinder 52 passes, first lens barrels 56A and 56B (see FIG. 3) which are inserted into the fixed cylinder 52, and a first lens group 58 (see FIG. 3).

The first rotating cylinder 54 is formed in a cylindrical shape. The first rotating cylinder 54 is disposed at a position where the central axis thereof is concentric with the central axis of the fixed cylinder 52. In addition, a gear portion 62 formed in an annular shape when viewed from the K direction is formed in one end portion (a part on the screen 18 (see FIG. 1) side) in the K direction on the outer circumferential surface of the first rotating cylinder 54. In the inner circumference of the first rotating cylinder 54, helicoid grooves (spiral grooves) (not shown) are formed. Even if the first rotating cylinder 54 is rotated around the optical axis K, the position of the first rotating cylinder 54 in the K direction with respect to the cylinder 52 is not changed.

Figure 3:
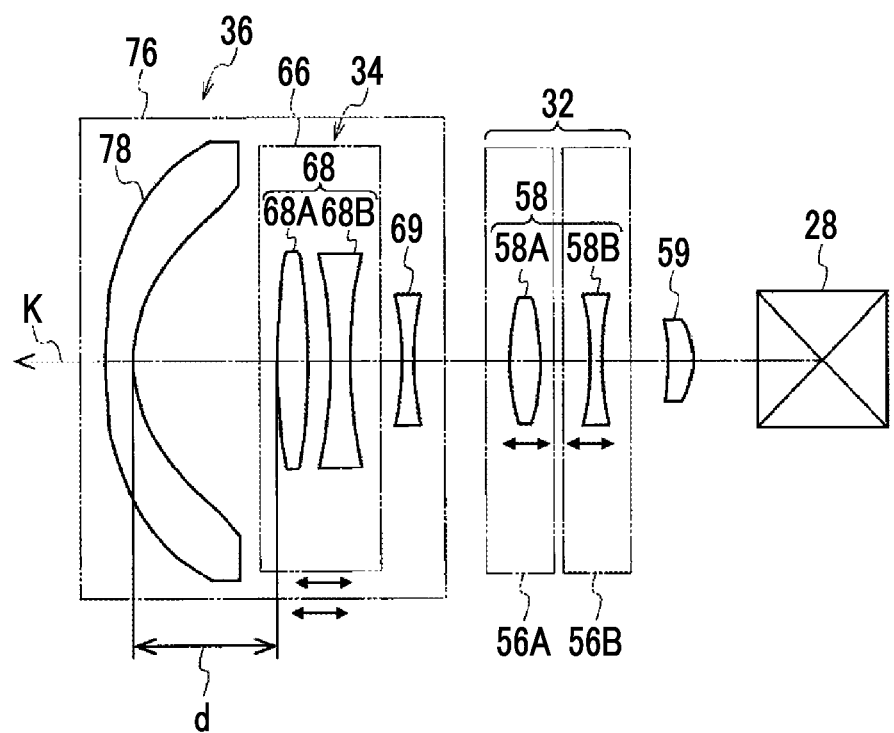
FIG. 3 is an explanatory view showing the arrangement of a first lens group, a second lens group, and a focus lens according to this embodiment.

FIG. 3 shows the dichroic prism 28 and respective members provided inside the fixed cylinder 52 (see FIG. 2) in a schematic view. The first lens barrels 56A and 56B are formed in a cylindrical shape. The first lens barrels 56A and 56B are disposed at positions where the central axes thereof are concentric with the central axis of the fixed cylinder 52 (see FIG. 2), and inside the fixed cylinder 52 in the radial direction. In addition, in the outer circumferential surfaces of the first lens barrels 56A and 56B, pins (not shown) which respectively protrude to the outside in the radial direction are formed. The pins of the first lens barrels 56A and 56B are respectively inserted into the long holes (not shown) of the fixed cylinder 52 and the helicoid grooves (not shown) of the first rotating cylinder 54 (see FIG. 2). Accordingly, a configuration is made in which if the first rotating cylinder 54 is rotated around the optical axis K, the first lens barrels 56A and 56B move along the optical axis K.

The first lens group 58 shown in FIG. 3 is an example of a first optical system. The first lens group 58 has, as an example, a lens 58A and a lens 58B. The lens 58A is fixed inside the first lens barrel 56A. The lens 58B is fixed inside the first lens barrel 56B. The lens 58A and the lens 58B are configured such that the positions thereof in the K direction are relatively changed with the movement of the first lens barrels 56A and 56B, thereby enlarging or reducing a projected image (not shown).

Image Plane Correction Unit

The image plane correction unit 34 shown in FIG. 2 is disposed on the screen 18 (see FIG. 1) side with respect to the zoom adjustment unit 32 in the K direction. The image plane correction unit 34 has a second rotating cylinder 64 through which the fixed cylinder 52 passes, a second lens barrel 66 (see FIG. 3) which is inserted into the fixed cylinder 52, and a second lens group 68 (see FIG. 3) which is fixed inside the second lens barrel 66.

The second rotating cylinder 64 is formed in a cylindrical shape. The second rotating cylinder 64 is disposed at a position where the central axis thereof is concentric with the central axis of the fixed cylinder 52. In addition, a gear portion 72 formed in an annular shape when viewed from the K direction is formed in the other end portion (a part on the first rotating cylinder 54 side) in the K direction in the outer circumferential surface of the second rotating cylinder 64. In the inner circumference of the second rotating cylinder 64, helicoid grooves (spiral grooves) (not shown) are formed. Even if the second rotating cylinder 64 is rotated around the optical axis K, the position of the second rotating cylinder 64 in the K direction with respect to the fixed cylinder 52 is not changed.

The second lens barrel 66 shown in FIG. 3 is formed in a cylindrical shape. The second lens barrel 66 is disposed at a position where the central axis thereof is concentric with the central axis of the fixed cylinder 52 (see FIG. 2), and inside the fixed cylinder 52 in the radial direction. In the outer circumferential surface of the second lens barrel 66, pins (not shown) which protrude to the outside in the radiation direction. The pins of the second lens barrel 66 are inserted into long holes (not shown) of a third lens barrel 76 described below, the long holes (not shown) of the fixed cylinder 52, and the helicoid grooves (not shown) of the second rotating cylinder 64 (see FIG. 2). Accordingly, a configuration is made in which, if the second rotating cylinder 64 is rotated around the optical axis K, the second lens barrel 66 moves along the optical axis K.

The second lens group 68 shown in FIG. 3 is an example of a second optical system. The second lens group 68 has, as an example, a lens 68A and a lens 68B. The lens 68A and the lens 68B are configured such that the positions thereof in the K direction are changed with the movement of the second lens barrel 66, thereby performing image plane correction in the peripheral portion of the screen 18 (see FIG. 1).

Focus Adjustment Unit

The focus adjustment unit 36 shown in FIG. 2 is disposed on the screen 18 (see FIG. 1) side (projected image side) with respect to the image plane correction unit 34 in the K direction. The focus adjustment unit 36 has a third rotating cylinder 74 through which the fixed cylinder 52 passes, a third lens barrel 76 (see FIG. 3) which is inserted into the fixed cylinder 52, and a focus lens 78 (see FIG. 3) which is fixed inside the third lens barrel 76.

The third rotating cylinder 74 is formed in a cylindrical shape. The third rotating cylinder 74 is disposed at a position where the central axis thereof is concentric with the central axis of the fixed cylinder 52. In the other end portion (a part on the second rotating cylinder 64 side) in the K direction in the outer circumferential surface of the third rotating cylinder 74, a gear portion 82 formed in an annular shape when viewed from the K direction is formed. In the inner circumference of the third rotating cylinder 74, helicoid grooves (spiral grooves) (not shown) are formed. Even if the third rotating cylinder 74 is rotated around the optical axis K, the position of the third rotating cylinder 74 in the K direction with respect to the fixed cylinder 52 is not changed.

The third lens barrel 76 shown in FIG. 3 is formed in a cylindrical shape. The third lens barrel 76 is disposed at a position where the central axis thereof is concentric with the central axis of the fixed cylinder 52 (see FIG. 2), and inside the fixed cylinder 52 in the radial direction. Inside the third lens barrel 76, a lens 69 is fixed in an end portion on the first lens barrel 56A side. In the outer circumferential surface of the third lens barrel 76, pins (not shown) which protrude to the outside in the radial direction are formed. The pins of the third lens barrel 76 are inserted into the long holes (not shown) of the fixed cylinder 52 and the helicoid grooves (not shown) of the third rotating cylinder 74 (see FIG. 2). Accordingly, a configuration is made in which, if the third rotating cylinder 74 is rotated around the optical axis K, the third lens barrel 76 moves along the optical axis K.

The focus lens 78 shown in FIG. 3 is an example of a third optical system. The focus lens 78 is configured such that the position thereof in the K direction is changed with the movement of the third lens barrel 76, thereby adjusting the focus of the projected image on the screen 18 (see FIG. 1). Inside the third lens barrel 76, the focus lens 78, the lens 68A, the lens 68B, and the lens 69 are arranged from a side close to the screen 18 (see FIG. 1) to a far side.

First Drive Unit

The first drive unit 38 shown in FIG. 2 is an example of a drive unit, and is disposed in parallel with the first rotating cylinder 54 in a direction perpendicular to the K direction. The first drive unit 38 has a motor body 84, a shaft 86 which is rotationally driven by the motor body 84, a switching gear 88 which is fixed to a distal end of the shaft 86, and a coil spring 92 which is provided between the switching gear 88 and the motor body 84. Furthermore, the first drive unit 38 is provided with the solenoid actuator 44 (see FIG. 4) and a position sensor 94 (see FIG. 4).

The operations of the motor body 84 and the solenoid actuator 44 are controlled by the control unit 20 (see FIG. 1). The details of the control unit 20 will be described below.

The shaft 86 is disposed in the K direction, and protrudes from an end surface on one end side (the screen 18 (see FIG. 1) side) of the motor body 84 toward the screen 18. The shaft 86 is movable in the K direction with respect to the motor body 84. The shaft 86 is configured to be switched to two different positions with respect to the motor body 84 with the operation of the solenoid actuator 44 (see FIG. 4).

Switching Gear

The switching gear 88 is an example of a connection portion, and has a first gear 88A which is coupled to the gear portion 62, and a second gear 88B which is coupled to the gear portion 72. The first gear 88A and the second gear 88B are fixed to the shaft 86 at an interval in the K direction. The first gear 88A is disposed on side closer to the motor body 84 than the second gear 88B.

Figure 5A:
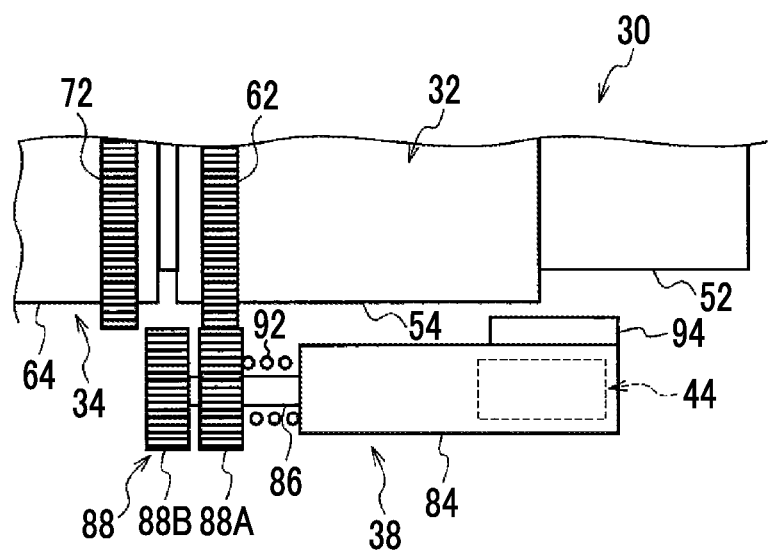
FIG. 5A is an explanatory view showing a state in which a switching gear according to this embodiment is disposed at a second position.
Figure 5B:
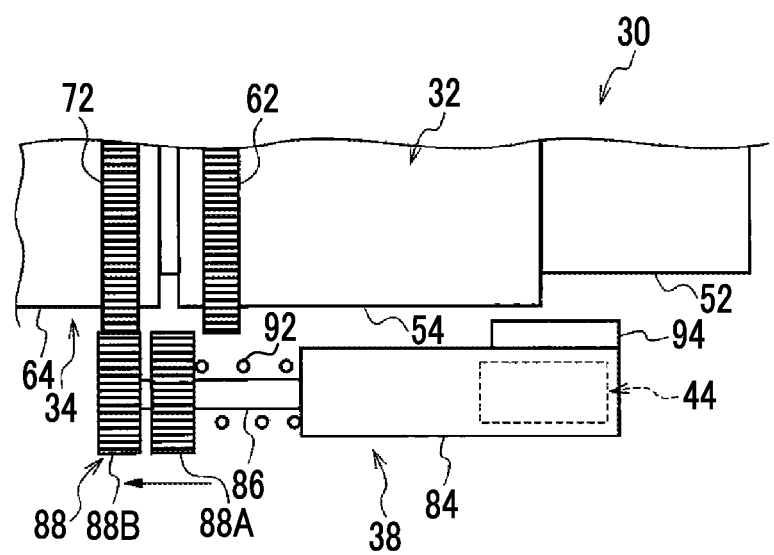
FIG. 5B is an explanatory view showing a state in which the switching gear according to this embodiment is disposed at a first position.

As shown in FIG. 5A, the first gear 88A and the second gear 88B are disposed such that, in a case where the first gear 88A and the gear portion 62 are connected, the second gear 88B and the gear portion 72 are not connected. As shown in FIG. 5B, the first gear 88A and the second gear 88B are disposed such that, in a case where the second gear 88B and the gear portion 72 are connected, the first gear 88A and the gear portion 62 are not connected. That is, the switching gear 88 is configured to be selectively connected to one or the other of the zoom adjustment unit 32 and the image plane correction unit 34.

The two different positions where the switching gear 88 is disposed are referred to as a first position and a second position. In a case where the switching gear 88 is disposed at the first position, the second gear 88B and the gear portion 72 are connected. In a case where the switching gear 88 is disposed at the second position, the first gear 88A and the gear portion 62 are connected. The switching gear 88 is configured such that movement to the screen 18 (see FIG. 1) side from the first position is restricted by a stopper (not shown).

Solenoid Actuator

The solenoid actuator 44 shown in FIG. 2 is an example of a switching unit. The solenoid actuator 44 is provided in the first drive unit 38, and the operation of the solenoid actuator 44 is controlled by the control unit 20 (see FIG. 1). Specifically, in a case of driving the zoom adjustment unit 32, the solenoid actuator 44 attracts the shaft 86 to switch the switching gear 88 from the first position to the second position. In a case of driving the image plane correction unit 34, solenoid actuator 44 releases the attraction of the shaft 86. Then, the switching gear 88 is switched from the second position to the first position by reaction force of the coil spring 92. In addition, the solenoid actuator 44 is provided with the position sensor 94.

Position Sensor

The position sensor 94 shown in FIG. 2 is an example of a position detection unit, and detects a connection position (the first position or the second position) of the switching gear 88 to either of the zoom adjustment unit 32 or the image plane correction unit 34. Specifically, the position sensor 94 is, as an example, a sensor which detects the connection position using a difference in magnetic flux leakage of a coil (not shown) of the solenoid actuator 44 depending on the position of the shaft 86 in the K direction. That is, the position sensor 94 is configured to detect the first position and the second position of the switching gear 88 with change in magnetic flux leakage of the coil (not shown) of the solenoid actuator 44.

Second Drive Unit

The second drive unit 42 is an example of a different drive unit, and is disposed in parallel with the first rotating cylinder 54 and the second rotating cylinder 64 in a direction perpendicular to the K direction. The second drive unit 42 has a motor body 96, a shaft 97 which is rotationally driven by the motor body 96, and a gear 98 which is fixed to a distal end of the shaft 97. The operation of the motor body 96 is controlled by the control unit 20 (see FIG. 1).

Input Unit

Figure 4:
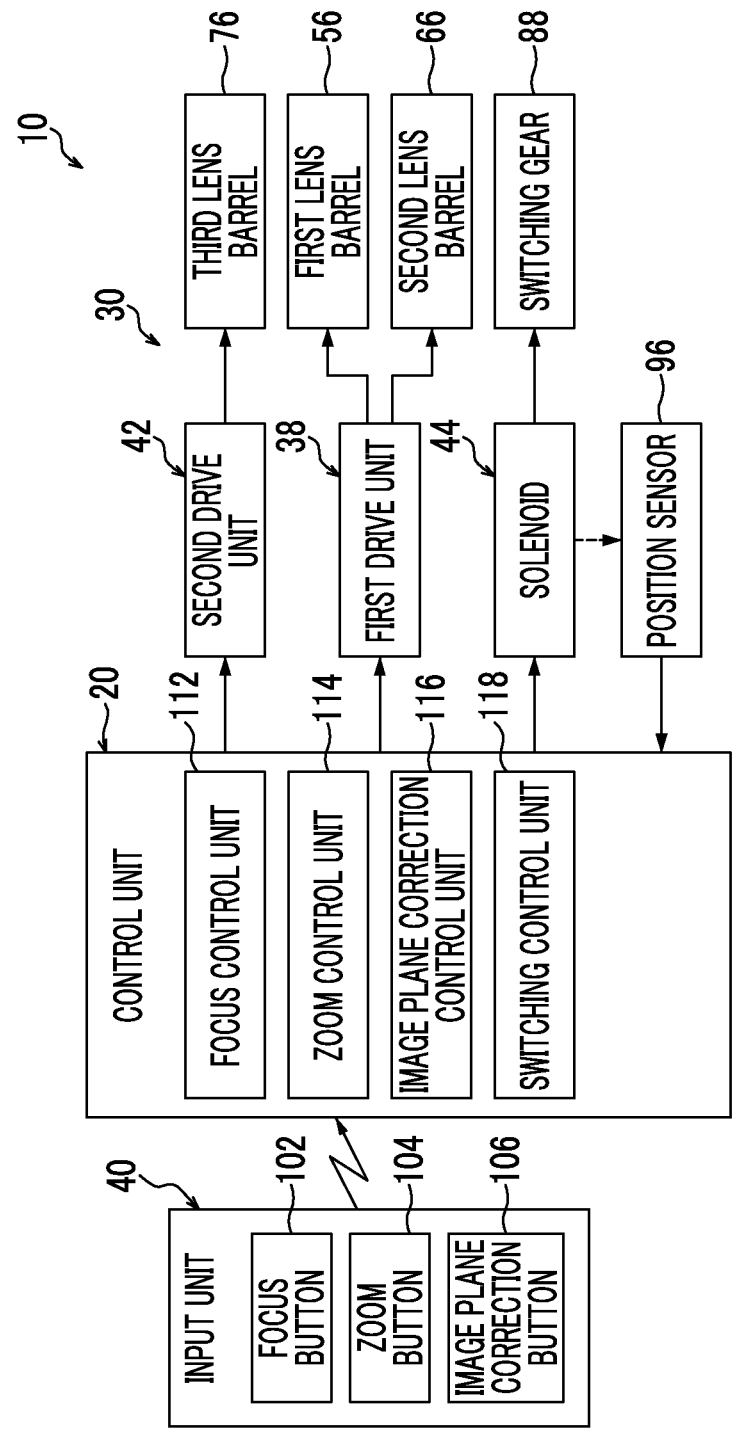
FIG. 4 is a block diagram showing the schematic configuration of a projector according to this embodiment.

As shown in FIG. 4, the input unit 40 is, as an example, a remote controller which performs infrared communication with respect to the control unit 20. The illustration and description of a transmission unit and a reception unit of an infrared ray in the control unit 20 and the input unit 40 will be omitted.

The input unit 40 is provided with a focus button 102 which is used to adjust the focus of the projected image onto the screen 18 (see FIG. 1), a zoom button 104 which is used to change the magnification of the projected image, and an image plane correction button 106 which is used to perform image plane correction on the projected image. Then, the input unit 40 is configured to output an operation signal to the control unit 20 according to operation contents of the focus button 102, the zoom button 104, and the image plane correction button 106 operated by a user. Each of the focus button 102, the zoom button 104, and the image plane correction button 106 is provided with a pair of plus adjustment and minus adjustment.

Control Unit

A control unit 20 shown in FIG. 4 includes a central processing unit (CPU), a random access memory (RAM), and a read only memory (ROM) (not shown), and functions as a computer. The control unit 20 is configured to operate according to a program stored in the ROM and control the operations of the respective units of the projector 10. In addition, the control unit 20 has, as an example, a focus control unit 112, a zoom control unit 114, an image plane correction control unit 116, and a switching control unit 118.

Focus Control Unit

The focus control unit 112 shown in FIG. 4 is configured to output a switching command of the switching gear 88 to the first position described above to the switching control unit 118 in a case where the user operates the focus button 102 and a focus command is input to the control unit 20. Then, the focus control unit 112 is configured to drive the first drive unit 38 in conjunction with the drive of the second drive unit 42 and control the image plane correction unit 34 under a condition that the position sensor 94 detects that the connection position of the switching gear 88 is the first position. The focus adjustment unit 36 (see FIG. 2) moves the focus lens 78 (see FIG. 3) in the K direction under the control of the focus control unit 112.

That is, the focus control unit 112 is configured to control the second drive unit 42 and the first drive unit 38 to perform focus adjustment and image plane correction simultaneously in a case where the second gear 88B (see FIG. 2) of the switching gear 88 is connected to the gear portion 72 (see FIG. 2). In the following description, simultaneously performing of the focus adjustment and the image plane correction in the focus control unit 112 is referred to as simultaneous adjustment.

In the focus control unit 112, the amount of movement of the third lens barrel 76 with respect to the amount of movement of the second lens barrel 66 is set in advance. That is, the focus control unit 112 is configured to determine the amount of movement of the second lens barrel 66 according to the amount of operation of the focus button 102 operated by the user and determine the amount of movement of the third lens barrel 76.

In a case of simultaneous adjustment, the focus control unit 112 performs control such that the first drive unit 38 moves the focus lens 78 and the second lens group 68 in a state where the interval between the focus lens 78 (see FIG. 3) and the second lens group 68 (see FIG. 3) on the optical axis K is maintained. As shown in FIG. 3, in this embodiment, the interval between the focus lens 78 and the second lens group 68 on the optical axis K is represented by the interval d between the focus lens 78 and the lens 68A.

Zoom Control Unit

The zoom control unit 114 shown in FIG. 4 is configured to output a switching command of the switching gear 88 to the second position described above to the switching control unit 118 in a case where the user operates the zoom button 104 and a zoom command is input to the control unit 20. Then, the zoom control unit 114 is configured to control the first drive unit 38 to enlarge or reduce the projected image in a case where switching of the switching gear 88 to the second position is detected by the position sensor 94.

Image Plane Correction Control Unit

The image plane correction control unit 116 shown in FIG. 4 is configured to output a switching command of the switching gear 88 to the first position described above to the switching control unit 118 in a case where the user operates the image plane correction button 106 and an image plane correction command is input to the control unit 20. Then, the image plane correction control unit 116 is configured to control the first drive unit 38 to perform the image plane correction under a condition that the position sensor 94 detects the connection position of the switching gear 88 is the first position.

In the projector 10 of this embodiment, since the image plane correction is performed simultaneously with the focus adjustment, the image plane correction is performed alone only in a case where the user operates the image plane correction button 106. That is, a configuration is made in which, in a case where the user operates the focus button 102, the focus adjustment and the image plane correction are performed simultaneously, and in a case where the user operates the image plane correction button 106, only the image plane correction is performed.

Switching Control Unit

The switching control unit 118 shown in FIG. 4 is configured to determine the necessity for the drive of the solenoid actuator 44 based on the detection result of the connection position of the switching gear 88 by the position sensor 94 in a case where the switching commands from the focus control unit 112 and the image plane correction control unit 116 are input. That is, in the simultaneous adjustment or the image plane correction, in a case where the switching gear 88 is at the first position, the switching control unit 118 does not drive the solenoid actuator 44. At the time of the focus adjustment or the image plane correction, in a case where the switching gear 88 is at the second position, the switching control unit 118 drives the solenoid actuator 44 and switches the switching gear 88 from the second position to the first position. At the time of the zoom adjustment, the switching control unit 118 performs control for switching the switching gear 88 from the first position to the second position.

Operation

Next, operation of the projection device, the projector, and the image adjustment method of this embodiment will be described.

Methods (procedures) of zoom adjustment, focus adjustment, and image plane correction in the projector 10 and the projection unit 30 will be described referring to the flowchart of FIG. 6. In the following description, FIGS. 1 to 5A and 5B are referred to for the respective units and the respective members constituting the projector 10, and description of the figure numbers will be omitted. It is assumed that a projected image is projected from the projector 10 onto the screen 18.

Zoom Adjustment

In the flowchart shown in FIG. 6, in Step S100, it is determined whether or not the zoom command is input to the control unit 20. Then, in a case where the user operates the zoom button 104 of the input unit 40 and the zoom command is input to the control unit 20, the process progresses to Step S102. In a case where the user does not operate the zoom button 104 (in a case where the zoom command is not input), the process progresses to Step S112.

In Step S102, information regarding the connection position of the switching gear 88 detected by the position sensor 94 is input to the control unit 20. Then, the process progresses to Step S104.

In Step S104, it is determined whether or not the switching gear 88 is disposed at the second position. Then, in a case where it is determined that the switching gear 88 is disposed at the first position, the process progresses to Step S106. In a case where it is determined that the switching gear 88 is disposed at the second position, the process progresses to Step S108.

In Step S106, the switching control unit 118 drives the solenoid actuator 44, whereby the switching gear 88 is switched to the second position. Then, the process progresses to Step S104, and Steps S104 and S106 are repeated until it is determined that the switching gear 88 is disposed at the second position. The switching gear 88 is disposed at the second position, whereby the first gear 88A of the switching gear 88 is connected to the gear portion 62.

In Step S108, the zoom control unit 114 performs control such that the first drive unit 38 drives the zoom adjustment unit 32, whereby the first lens barrels 56A and 56B relatively move in the K direction. Specifically, if control is performed such that the first drive unit 38 drives the zoom adjustment unit 32, the first rotating cylinder 54 is rotated in a state where the first gear 88A of the switching gear 88 is connected to the gear portion 62. In addition, the first lens barrels 56A and 56B and the first lens group 58 relatively move in the K direction, and the zoom adjustment (enlargement or reduction of the projected image) is performed. Then, the process progresses to Step S110.

In Step S110, it is determined whether or not to end the zoom adjustment. Then, in a case where the zoom command is input, the process progresses to Step S108. In a case where the zoom command is not input, the process progresses to Step S112. Steps S100 to S110 are an example of a first step.

Focus Adjustment and Image Plane Correction

In Step S112, it is determined whether or not the focus command is input to the control unit 20. Then, in a case where the user operates the focus button 102 of the input unit 40 and the focus command is input to the control unit 20, the process progresses to Step S114. In a case where the user does not operate the focus button 102 (in a case where the focus command is not input), the process progresses to Step S124.

In Step S114, information regarding the connection position of the switching gear 88 detected by the position sensor 94 is input to the control unit 20. Then, the process progresses to Step S116.

In Step S116, it is determined whether or not the switching gear 88 is disposed at the first position. Then, in a case where it is determined that the switching gear 88 is disposed at the second position, the process progresses to Step S118. In a case where it is determined that the switching gear 88 is disposed at the first position, the process progresses to Step S120.

In Step S118, the switching control unit 118 stops the drive of the solenoid actuator 44, whereby the switching gear 88 is switched to the first position. Then, the process progresses to Step S116, and Steps S116 and S118 are repeated until it is determined that the switching gear 88 is disposed at the first position. The switching gear 88 is disposed at the first position, whereby the second gear 88B of the switching gear 88 is connected to the gear portion 72.

In Step S120, the focus control unit 112 performs control such that the first drive unit 38 and the second drive unit 42 drive the focus adjustment unit 36 and the image plane correction unit 34, whereby the second lens barrel 66 and the third lens barrel 76 move in the K direction in conjunction with each other. In the focus adjustment unit 36, the third rotating cylinder 74 is rotated in a state where the gear 98 and the gear portion 82 are connected. With the rotation of the third rotating cylinder 74, the third lens barrel 76 moves in the K direction, and the focus adjustment of the projected image is performed.

In the image plane correction unit 34, the second rotating cylinder 64 is rotated in a state where the second gear 88B of the switching gear 88 and the gear portion 72 are connected. With the rotation of the second rotating cylinder 64, the second lens barrel 66 moves in the K direction, and the image plane correction is performed. In a case where the second lens barrel 66 moves in the K direction, the focus lens 78 and the lens 68A move while maintaining the interval d on the optical axis K. Then, the process progresses to Step S122.

In Step S122, it is determined whether or not to end the focus adjustment. Then, in a case where the focus command is input, the process progresses to Step S120. In a case where the focus command is not input, the process progresses to Step S124. Steps S112 to S122 are an example of a second step.

In Step S124, it is determined whether or not to execute the image plane correction. Then, in a case where the image plane correction command is input, the process progresses to Step S126. In a case where the image plane correction command is not input, the process progresses to Step S130.

In Step S126, only the first drive unit 38 is controlled by the image plane correction control unit 116, the image plane correction unit 34 is driven to make the second lens barrel 66 move in the K direction, and the image plane correction of the projected image is performed. Specifically, the user confirms a focus state in a central portion of the projected image and a focus state in a peripheral portion, and in a case where a difference between the focus states is observed, presses the image plane correction button 106, whereby the image plane correction is performed. Then, the process progresses to Step S128.

In Step S128, it is determined whether or not to end the image plane correction. Then, in a case where the image plane correction command is input, the process progresses to Step S126. In a case where the image plane correction command is not input, the process progresses to Step S130. Steps S124 to S128 are an example of a third step.

In Step S130, it is determined whether or not to end image adjustment (zoom adjustment, focus adjustment, image plane correction, or the like) of the projected image. Then, in a case where any one of the zoom command, the focus command, and the image plane correction command is input, the process progresses to Step S100. In a case where none of the zoom command, the focus command, and the image plane correction command is input, the process ends.

As described above, in the projector 10 and the projection unit 30 of this embodiment, the switching gear 88 is switched by the solenoid actuator 44, whereby the zoom adjustment unit 32 and the image plane correction unit 34 are driven by the single first drive unit 38. In other words, the first drive unit 38 for zoom adjustment which is not required at the time of the focus adjustment is used for the drive of the image plane correction unit 34 in the simultaneous adjustment or independent image plane correction. In the projector 10 and the projection unit 30, since the image plane correction unit 34 can be driven without increasing drive units, it is possible to automate the image plane correction with a simple configuration.

In the projector 10 and the projection unit 30 of this embodiment, the amount of movement of the third lens barrel 76 with respect to the amount of movement of the second lens barrel 66 is set in advance in the focus control unit 112. Then, in a case where the second drive unit 42 drives the focus adjustment unit 36, the first drive unit 38 drives the image plane correction unit 34 in conjunction with the second drive unit 42. The first drive unit 38 drives the image plane correction unit 34 in conjunction with the second drive unit 42, whereby it is possible to perform correction (image plane correction) of a field curvature varying due to a focus operation simultaneously with the focus adjustment. Since a command of image plane correction is not required, it is possible to reduce complicated adjustment work of the user at the time of the image plane correction.

In the projector 10 and the projection unit 30 of this embodiment, the focus adjustment unit 36 is disposed on the projected image side from the image plane correction unit 34 in the K direction. The focus adjustment unit 36 is disposed on the projected image side from the image plane correction unit 34 in the K direction, whereby it is possible to approach the image plane correction unit 34 and the zoom adjustment unit 32 driven by the common first drive unit 38 each other. In addition, the gear portion 62 is formed on the second rotating cylinder 64 side in the first rotating cylinder 54, and the gear portion 72 is formed on the first rotating cylinder 54 side in the second rotating cylinder 64. Therefore, in the projection unit 30, since the moving distance of the switching gear 88 is shortened compared to a configuration in which the gear portion 62 is disposed on a side opposite to the second rotating cylinder 64 side and the gear portion 72 is disposed on the third rotating cylinder 74 side, it is possible to reduce the first drive unit 38 in size.

In the projector 10 and the projection unit 30 in this embodiment, since the image plane correction unit 34 is drivable in a case where the position sensor 94 detects that the connection position of the switching gear 88 is the first position, it is possible to suppress an erroneous operation of the image plane correction unit 34.

In the projector 10 and the projection unit 30 of this embodiment, the second lens group 68 moves in a state where the interval d between the focus lens 78 and the lens 68A on the optical axis K is maintained. The interval d between the focus lens 78 and the lens 68A on the optical axis K is maintained, whereby, since the moving distance of the second lens group 68 required for adjustment of the second lens group 68 after the focus adjustment is shortened, it is possible to shorten the time required for the focus adjustment and the image plane correction.

In the image adjustment method of this embodiment, in a case where the focus adjustment and the image plane correction are performed simultaneously, even if deviation occurs in the adjustment state of the image plane correction, since the image plane correction unit 34 can be driven alone to perform adjustment, it is possible to increase the accuracy of the image plane correction.

The invention is not limited to the foregoing embodiment.

The image forming panels are not limited to the transmissive liquid crystal panels 26R, 26Q and 26B, and may be digital micromirror devices (DMDs).

The image variable magnification unit is not limited to the zoom adjustment unit 32 in which the first gear 88A and the gear portion 62 are connected directly, and may have a configuration in which a different gear is interposed between the first gear 88A and the gear portion 62.

The image plane correction unit is not limited to the image plane correction unit 34 in which the second gear 88B and the gear portion 72 are connected directly, and may have a configuration in which a different gear is interposed between the second gear 88B and the gear portion 72.

The focus adjustment unit is not limited to the focus adjustment unit 36 in which the gear 98 and the gear portion 82 are connected directly, and may have a configuration in which a different gear is interposed between the gear 98 and the gear portion 82. The focus adjustment unit may be disposed on a side opposite to the projected image side with respect to the image plane correction unit. The focus adjustment unit may have a configuration in which the second lens group 68 is moved in a state where the interval d between the focus lens 78 and the second lens group 68 on the optical axis K is not maintained.

The first optical system is not limited to the first lens group 58 using the lenses 58A and 58B, and may have a configuration using a plurality of lenses of three or more lenses. The second optical system is not limited to the second lens group 68 using the lenses 68A and 68B, and may have a configuration using one or three or more lenses. The third optical system is not limited to the focus lens 78, and may be constituted of a plurality of lenses including the focus lens 78.

The connection portion is not limited to the switching gear 88 which has the first gear 88A and the second gear 88B and is disposed at the first position or the second position, and may be one gear which is disposed at the first position or the second position. A configuration may be made in which, in a state where the first gear 88A and the gear portion 62 mesh with each other and the second gear 88B and the gear portion 72 mesh with each other, drive is transmitted to one side and transmission of drive to the other side is shut off using an electromagnetic clutch.

The position detection unit is not limited to the position sensor 94 which detects the connection position of the switching gear 88 by detecting change in magnetic flux leakage. For example, an optical sensor which includes a light emitting portion and a light receiving portion and detects the presence or absence of shut-off of light incident on the light receiving portion may be used. It may be prescribed that the switching gear 88 is at the first position when the drive of the solenoid actuator 44 is stopped, and the switching gear 88 is at the second position when the solenoid actuator 44 is driven, and the presence or absence of the drive of the solenoid actuator 44 may be detected.

The projector 10 is not limited to a configuration in which the focus adjustment and the image plane correction are performed simultaneously, and may have a configuration in which the focus adjustment and the image plane correction are performed separately. A configuration may be made in which the image plane correction may be started during the focus adjustment. The projector 10 may have a configuration in which the interval d between the focus lens 78 and the lens 68A is not maintained.

In the projector 10, the image plane correction may be divided into the zoom adjustment, and the focus adjustment and the image plane correction, and the focus adjustment and the image plane correction may be performed earlier than the zoom adjustment.

EXPLANATION OF REFERENCES

10: projector
14: light source unit (example of light source)
18: screen (example of projection surface)
26B: liquid crystal panel (example of image forming panel)
26G: liquid crystal panel (example of image forming panel)
26R: liquid crystal panel (example of image forming panel)
30: projection unit (example of projection device)
32: zoom adjustment unit (example of image variable magnification unit)
34: image plane correction unit
36: focus adjustment unit
38: first drive unit (example of drive unit)
42: second drive unit (example of different drive unit)
44: solenoid actuator (example of switching unit)
58: first lens group (example of first optical system)
68: second lens group (example of second optical system)
78: focus lens (example of third optical system)
88: switching gear (example of connection portion)
94: position sensor (example of position detection unit)

What is claimed is:

1. A projection device comprising:
an image variable magnification unit which includes a first optical system including a plurality of lenses and enlarges or reduces a projected image by moving the first optical system in an optical axis direction of light from a light source;
an image plane correction unit which includes a second optical system and performs image plane correction on the projected image by moving the second optical system in the optical axis direction;
a drive unit which includes a connection portion being selectively connected to one of the image variable magnification unit and the image plane correction unit, moves the first optical system in the optical axis direction by driving the image variable magnification unit in a state in which the connection portion is connected to the image variable magnification unit, and moves the second optical system in the optical axis direction by driving the image plane correction unit in a state in which the connection portion is connected to the image plane correction unit;
a switching unit which is provided in the drive unit, and in a case of driving one of the image variable magnification unit and the image plane correction unit, switches the connection portion from the other of the image variable magnification unit and the image plane correction unit to the one of the image variable magnification unit and the image plane correction unit;
a focus adjustment unit which includes a third optical system and moves the third optical system in the optical axis direction to adjust the focus of the projected image; and
a different drive unit which drives the focus adjustment unit,
wherein, in a case where the different drive unit drives the focus adjustment unit, the drive unit drives the image plane correction unit in conjunction with the drive of the different drive unit.

2. The projection device according to claim 1,
wherein the focus adjustment unit is disposed on the projected image side from the image plane correction unit.

3. The projection device according to claim 1,
wherein the switching unit is provided with a position detection unit which detects a connection position of the connection portion to either of the image variable magnification unit or the image plane correction unit, and in a case where the different drive unit drives the focus adjustment unit, after the position detection unit detects the connection position of the connection portion on the image plane correction unit side, the drive unit drives the image plane correction unit in conjunction with the drive of the different drive unit.

4. The projection device according to claim 2,
wherein the switching unit is provided with a position detection unit which detects a connection position of the connection portion to either of the image variable magnification unit or the image plane correction unit, and
in a case where the different drive unit drives the focus adjustment unit, after the position detection unit detects the connection position of the connection portion on the image plane correction unit side, the drive unit drives the image plane correction unit in conjunction with the drive of the different drive unit.

5. The projection device according to claim 1,
wherein, in a case where the different drive unit drives the focus adjustment unit, the drive unit drives the image plane correction unit in a state in which the interval between the third optical system and the second optical system on the optical axis is maintained.

6. The projection device according to claim 2,
wherein, in a case where the different drive unit drives the focus adjustment unit, the drive unit drives the image plane correction unit in a state in which the interval between the third optical system and the second optical system on the optical axis is maintained.

7. The projection device according to claim 3,
wherein, in a case where the different drive unit drives the focus adjustment unit, the drive unit drives the image plane correction unit in a state in which the interval between the third optical system and the second optical system on the optical axis is maintained.

8. The projection device according to claim 4,
wherein, in a case where the different drive unit drives the focus adjustment unit, the drive unit drives the image plane correction unit in a state in which the interval between the third optical system and the second optical system on the optical axis is maintained.

9. A projector comprising:
a light source;
an image forming panel which displays an image and is irradiated with light from the light source; and
the projection device according to claim 1 which projects the image formed on the image forming panel onto a projection surface.

10. A projector comprising:
a light source;
an image forming panel which displays an image and is irradiated with light from the light source; and
the projection device according to claim 2 which projects the image formed on the image forming panel onto a projection surface.

11. A projector comprising:
a light source;
an image forming panel which displays an image and is irradiated with light from the light source; and
the projection device according to claim 3 which projects the image formed on the image forming panel onto a projection surface.

12. A projector comprising:
a light source;
an image forming panel which displays an image and is irradiated with light from the light source; and
the projection device according to claim 4 which projects the image formed on the image forming panel onto a projection surface.

13. A projector comprising:
a light source;
an image forming panel which displays an image and is irradiated with light from the light source; and
the projection device according to claim 5 which projects the image formed on the image forming panel onto a projection surface.

14. A projector comprising:
a light source;
an image forming panel which displays an image and is irradiated with light from the light source; and
the projection device according to claim 6 which projects the image formed on the image forming panel onto a projection surface.

15. An image adjustment method which adjusts a projected image, using the projection device according to claim 1, by performing
a first step of driving the image variable magnification unit with the drive unit;
a second step of switching the connection portion from the image variable magnification unit to the image plane correction unit with the switching unit to simultaneously drive the image plane correction unit and the focus adjustment unit; and
a third step of driving the image plane correction unit alone with the drive unit.

16. An image adjustment method which adjusts a projected image, using the projection device according to claim 2, by performing
a first step of driving the image variable magnification unit with the drive unit;
a second step of switching the connection portion from the image variable magnification unit to the image plane correction unit with the switching unit to simultaneously drive the image plane correction unit and the focus adjustment unit; and
a third step of driving the image plane correction unit alone with the drive unit.

17. An image adjustment method which adjusts a projected image, using the projection device according to claim 3, by performing
a first step of driving the image variable magnification unit with the drive unit;
a second step of switching the connection portion from the image variable magnification unit to the image plane correction unit with the switching unit to simultaneously drive the image plane correction unit and the focus adjustment unit; and
a third step of driving the image plane correction unit alone with the drive unit.

18. An image adjustment method which adjusts a projected image, using the projection device according to claim 4, by performing
a first step of driving the image variable magnification unit with the drive unit;
a second step of switching the connection portion from the image variable magnification unit to the image plane correction unit with the switching unit to simultaneously drive the image plane correction unit and the focus adjustment unit; and
a third step of driving the image plane correction unit alone with the drive unit.

19. An image adjustment method which adjusts a projected image, using the projection device according to claim 5, by performing
   a first step of driving the image variable magnification unit with the drive unit;
   a second step of switching the connection portion from the image variable magnification unit to the image plane correction unit with the switching unit to simultaneously drive the image plane correction unit and the focus adjustment unit; and
   a third step of driving the image plane correction unit alone with the drive unit.

20. An image adjustment method which adjusts a projected image, using the projection device according to claim 6, by performing
   a first step of driving the image variable magnification unit with the drive unit;
   a second step of switching the connection portion from the image variable magnification unit to the image plane correction unit with the switching unit to simultaneously drive the image plane correction unit and the focus adjustment unit; and
   a third step of driving the image plane correction unit alone with the drive unit.

* * * * *